Feb. 10, 1970  A. E. FLANDERS ET AL  3,494,028
METHOD FOR MAKING A PEELABLE JOINT FOR AN ELECTRODE
Filed Dec. 30, 1966     2 Sheets-Sheet 1
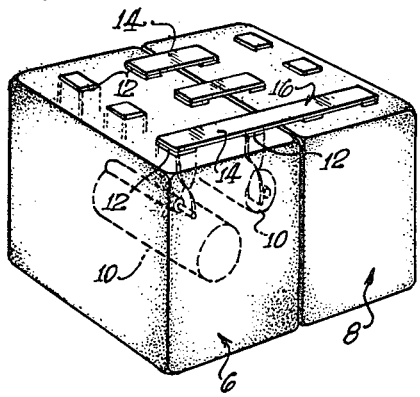
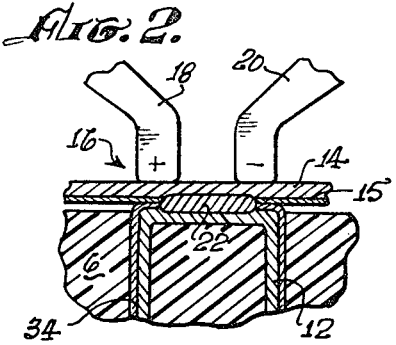
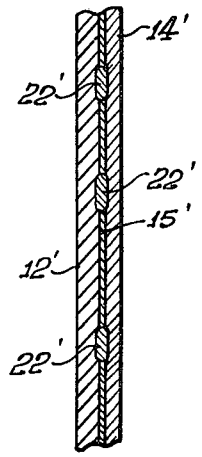
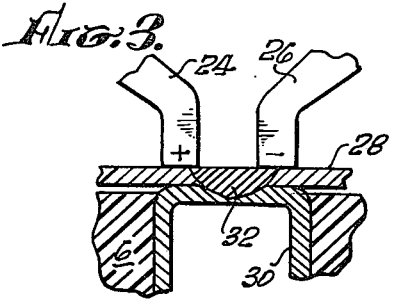
INVENTORS.
ANDREW E. FLANDERS,
JOHN L. GOFORTH,
PARLEY R. PACKER,
By   L E Carnahan
AGENT

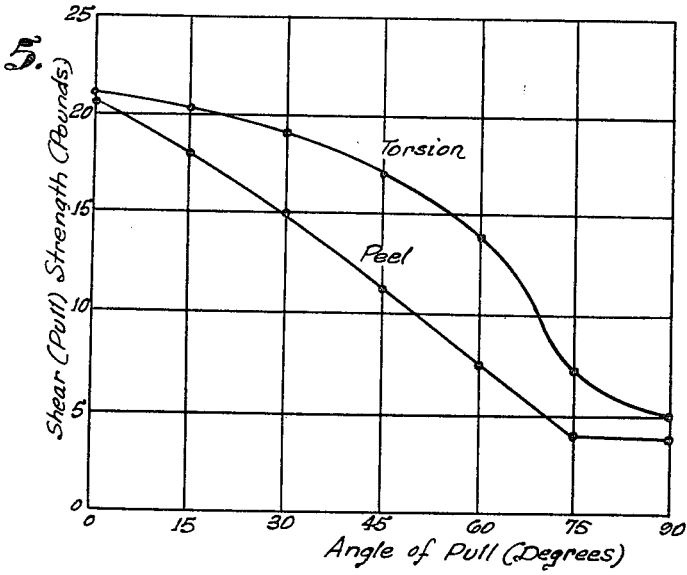
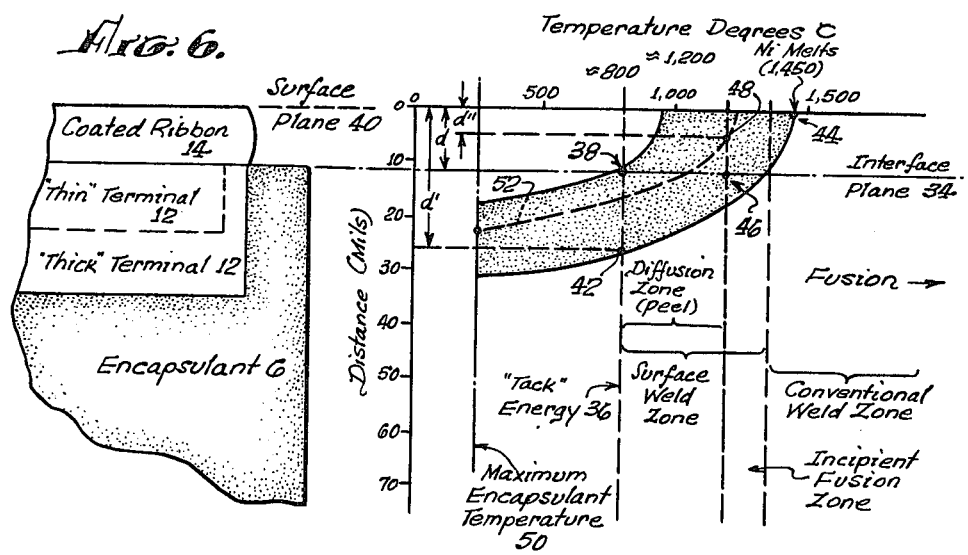

United States Patent Office 3,494,028
Patented Feb. 10, 1970

3,494,028
METHOD FOR MAKING A PEELABLE JOINT FOR AN ELECTRODE
Andrew E. Flanders, Pomona, John L. Goforth, San Diego, and Parley R. Packer, Alta Loma, Calif., assignors to General Dynamics Corporation, a corporation of Delaware
Filed Dec. 30, 1966, Ser. No. 606,140
Int. Cl. H01r *433/00*
U.S. Cl. 29—628          8 Claims

ABSTRACT OF THE DISCLOSURE

The disclosure is directed to a material suitable for welding applications, particularly to surface welding applications wherein metallic members may be readily connected, for example, by the application of welding electrodes to only one surface of the members being connected. The material may be applied to one or both of the surfaces to be connected by either electroplating operations, or by mixing desired percentages of various metallic powders in a suitable binder and applying the mixture directly to the areas to be welded. The material may be effectively utilized for interconnecting electrical components or for interconnection of structural materials. In addition, under certain conditions and with certain compositions of the material the welds produced are of a repairable nature so that replacement of certain components or parts can be accomplished without damage to these components or parts due to the welding operation.

RELATED APPLICATIONS

The fusible material of this invention may be applied to the members to be joined by a tank plating arrangement (electroplated), as exemplified by copending U.S. patent application Ser. No. 435,628 and assigned to the same assignee, or by applying the fusible material to a desired base metal in the form of a paint or ink, or by a grease type pencil or crayon (a dispersion), as exemplified by copending U.S. patent application Ser. No. 442,144, also assigned to the same assignee.

BACKGROUND OF THE INVENTION

Heretofore, interconnection of module components, for example, has generally been accomplished by such means as electronic harnesses, coaxial connectors, special cables, mechanical connectors and various transition arrangements. These means of interconnection, however, require the use of soldering and hence are subject to its well known shortcoming of cold-flow, lack of reliability, and relatively low resistance to adverse environmental conditions, such as vibration and shock; or these interconnections are accomplished by cross-wire welding operations as known in the art and hence are subject to the well known disadvantages of this type of interconnection. Interconnection of other metallic members such as structural components has been accomplished by conventional methods such as bolting, brazing or welding and their well known advantages and disadvantages.

In U.S. Patent No. 3,150,288 there is described in detail a unique transmission line which affords an improved means for joining together the components of one electrical module with the components of another such module. Although not limited to transmission lines, this invention has particular utility in accomplishing its joinder and accordingly such transmission lines will be herein referred to primarily as exemplary of an important use for describing the invention although the material of the invention may be readily used in other applications requiring the interconnection of metallic members and has particular utility in applications wherein serviceability is required.

SUMMARY OF THE INVENTION

For purposes of simplicity, the inventive material will be primarily described with respect to its use as a plated or coated surface of fusible material for electronic transmission lines but it is not intended to limit the invention to any particular use.

Briefly, electronic transmission lines having the inventive material coated or plated on at least one side may comprise a sheet, strip or ribbon for interconnecting component leads, etc., of an electronic module, header board, or printed circuit board, or for the like applications. The material to which the electronic transmission line is connected may or may not be coated or plated with the fusible inventive material, since only one or the other of the members need be coated or plated in the area of the joinder interface. Also a number of different metals may be used as the base metal of the sheet, strip, or ribbon, or may be joined by the fusible coating or plating of the transmission line. A joint utilizing this inventive material provides a simple yet effective mechanical and electrical connection which in some instances can be removed and reconnected many times without degradation of the quality of the mechanical or electrical interconnection.

As illustrated in the drawings, as an example only, the electronic transmission line with the inventive material thereon makes use of connector members formed from integral metal strips. Each connector member is provided with a contact section extending along the surface of a module or of a header board forming a part of a module. A tab section of the connector member extends from an end of the contact section into the module for electrical contact with a lead wire of at least one component. Also, as illustrated in the drawings, the fusible material of the invention can, for example, be effectively utilized in the interconnecting of structural members such as metallic wall panels but which may also be used for applying skin material to aircraft structure, or providing a repairable container opening, etc.

Welding is employed in making the joinder of, for example, electronic transmission lines to component leads or the like. Interconnections requiring serviceability can be made where only one side of the transmission material is exposed and available to the welding electrodes by surface welding techniques, as described hereinafter, and in which conventional welding techniques cannot be employed.

Briefly, the surface welding technique in conjunction with the unique plating or coating, effects an interface bond between joined members. As pointed out above, at least one of the two members to be welded is coated or plated as described hereinafter and the members are positioned face to face with the coated surface or surfaces in abutment. The two electrodes of the welding machine are positioned on one side and in contact with the exposed surface of one of the positioner members to be welded with a predetermined pressure applied thereto. Energy is then rapidly applied in predetermined quantity through the electrodes, as a result of which heat is rapidly applied to an area localized to the material disposed intermediate the members being joined. The metal of the material being interconnected is thereupon caused to diffuse, fuse and coact, creating a bond between the members which is strong in the shear direction but which may be broken by peeling and rewelded a number of times without degradation of the rewelded joint.

The fusible coating can be applied to the surface of a printed circuit and/or other members, such as a component lead surface welded to the printed circuit; or the coating can be applied to a ribbon, strip or sheet of suitable base metal and welded to another member.

Accordingly, it is an object of this invention to provide a fusible material for welding together members which results in a strong, reliable welded joint.

A further object of the invention is to provide a material which is capable of producing a joint when welded which may be broken and rewelded with little or no adverse effect upon the subsequent weld.

Another object of the invention is to provide a material for welding members which will provide minimum interference with the transmission capabilities of the joined conductor members and which joint is fully capable of handling a broad spectrum of frequency from DC to microwave.

Another object of the invention is to provide a material for the joinder of ribbon, sheet members, and the like, which may be accomplished where but one side of a member to be joined is available for welding electrode contact.

Another object of the invention is to provide a method for joining together members wherein at least one is coated with a suitable composition or with a suitable laminate of material in a predetermined range of percentages by weight.

Other objects and advantages of the invention will become readily apparent from the following description and accompanying drawings in which:

BRIEF DESCRIPTION OF DRAWINGS

FIG. 1 is a perspective view of two encapsulated modules, electrical components of which are joined together through electronic transmission lines coated with the inventive material;

FIG. 2 is a view in cross-section of a typical welding setup with the electrodes appropriately positioned for welding members coated with the inventive material;

FIG. 3 is a view in cross-section similar to that of FIG. 2, but illustrating a typical series welding operation;

FIG. 4 is a partial view in cross-section illustrating the interconnection of structural panel members coated with the inventive material;

FIG. 5 graphically presents the strength of welds utilizing fusible material at various angles of torsion and peel; and FIG. 6 illustrates the surface weld diffusion temperature and gradient.

DESCRIPTION OF THE INVENTION

The following description of the invention will be directed primarily to nickel as the base metal, for illustrative purposes only, and in no way should such description be considered as limiting the invention to this specific base metal since various other metals may be used, such as copper, silver, chromium, or nickel-iron alloy such as Kovar, each having atomic radii compatible with welding techniques.

Turning now to FIG. 1, there is shown an embodiment of the electronic transmission line having the fusible material coated thereon and employed in conjunction with encapsulated modules 6 and 8 to interconnect their respective electrical components 10, shown in phantom outline. Connected to each of the components 10 are integral metal strip members 12, of nickel for example, which project only slightly beyond the upper face of the modules to provide a terminal virtually flush with the module surface. Strip members 14, coated with the fusible material, extend between the terminals 12 to provide interconnection between their respective associated electrical components, with surface welding being accomplished at positions 16 of member face abutment, as presently described in detail. For purposes of clarity in describing this invention, the foregoing description and the FIG. 1 showing have been deliberately simplified. However, as previously indicated, the material of this invention is not limited to the particular transmission line or structural material illustrated, though having particular utility in conjunction therewith.

In FIG. 2 there is shown an arrangement for accomplishing welding of a strip member 14, employing the material of the invention, to a terminal member 12. It will be noted that the members 12 and 14 are each provided with a coating designated by numerals 15 and 34 which is employed with salutary effect in the interconnection of the members. Although both members are shown to be so coated, the coating of one or the other will generally suffice. Members 12 and 14 are juxtapositioned with their coated surfaces in abutment, i.e., at the location of the element-to-element bond to be accomplished by welding. A pair of welding electrodes 18 and 20 of rectangular cross-section are shown in FIG. 2 positioned upon the exposed surface of member 14 at position 16 immediately above underlying coated terminal member 12. It will be noted that because of the underlying terminal member support afforded by the module, the exposed upper surface of member 14 is the only member surface available to the welding electrodes. With rapid application of welding energy and with appropriate electrode pressure, as discussed hereinafter, a surface weld is effected with the fusing of the coatings and formation by strip coaction of a mutually formed alloy zone 22 and an interface bond. This bond is as strong or stronger than the base material of members 12 and 14.

In the as-welded condition, the interface bond of the transmission line, when utilized with nickel for example, is comprised primarily of nickel and the types of metals of the coating 15 as described in detail hereinafter. In the above referenced copending applications, the coating was composed of certain percentages of gold and indium and the base metal of nickel. Thus a ternary alloy of this composition may be considered to be predominantly composed of gold and nickel with the addition of indium to serve as a solid-state wetting or diffusant agent in addition to a hardening and an embrittling agent. When the transmission line utilizing nickel as the base metal for example, and coated with the above mentioned exemplary material, is welded to copper, for example, an interface quaternary alloy is created, which again exhibits properties of shear or torsion which are stronger than the base material and will therefore usually pull off the base copper metal member when removed.

It is important to note that there is here accomplished a surface weld, in contrast with a conventional series weld. In the latter type of weld, illustrated in FIG. 3, a resistance welding technique is employed wherein the current flows intermediate a pair of electrodes 24 and 26 through the abuttingly positioned members 28 and 30 to form a nugget 32. Energy is applied for a substantial period of time and the nugget formed extends the entire depth of upper member 28 and a substantial distance into the lower member 30. It is this nugget or fused portion, common to both members, which secures the joint. However, because of this sizable nugget, breaking of the welded joint cannot be accomplished without substantial damage or distortion to the joined members and obviously prevents rejoinder of either of the members at the same location.

In contrast with the conventional series welding techniques of FIG. 3, a surface weld is produced due to the inventive material coated on the base metal of at least one of the members joined. The surface welds produced will vary depending on the type of base metal, the composition of the fusible material coated or plated thereon, and the thickness of the coating or plating.

FIG. 4 illustrates an application of the inventive material for interconnecting structural members by surface welding techniques. A pair of structural members 12' and 14', such as metallic wall panelling, with member 14 having a coating 15' of the inventive fusible material, are interconnected via surface welds indicated at 22'. If desired, the welds 22' may be of a substantially continuous type by the application of welding electrodes to the exposed surface of either member 12' or 14' and by moving the electrodes along the seam at the proper rate to assure sufficient time for proper fusion or diffusion of the coating 15' and formation of an interface bond as described above with respect to FIG. 2.

To provide a greater understanding of the surface welding technique and the advantages thereof when utilizing the inventive fusible material, reference is made to FIGS. 5 and 6 and to the following explanation. A surface weld is accomplished by imparting heat in predetermined controlled quantity through the welding electrodes 18 and 20 to the interface of the strip members 12 and 14, i.e., in the area of the coating. Localizing of the heat at the interface is accomplished by rapid application of the electrode-imparted energy for a period of from approximately 2.5 to 10 milliseconds, depending on the characteristics of the welding equipment being used. Rapid application of heat assures the diffusion and fusion of the coating or coatings 15 and formation of an interface bond, but without fusion or diffusion of a large portion of the base metal of the members 12 and 14, as would be the case in conventional series welding applications. There is, however, a certain amount of the base metal which would be expected to enter into the bond and observations and tests have shown this to be the case. As indicated, the quantity of heat applied to the interface is important. This, of course, is controlled by the watt-second energy applied through the electrodes. Too little energy will result in, at most, an incomplete weld or a braze. Too much will produce burn-out, i.e., a boiling out of the base material creating a void between the electrodes and/or no weld at all.

Since diffusion is dependent on time as well as temperature, the pulse time affects the weld. A very short pulse does not provide adequate time for good heat penetration prior to melting the top surface and is too brief to permit good mutual diffusion. The pulse time or pulse dwell should be adequate to permit mutual diffusion and the change of state from initial plasticity to final "freezing" of the materials being welded. Thus, different welders and/or different materials and thermal masses being welded will require different pulse times. The state of welder art has been greatly advanced in recent years thus providing a capability of producing a pulse time or dwell at the present time which is considerably longer than that available in earlier welders.

Surface welds tolerate a wide range of electrode pressure. Good welds are obtained above a certain minimum pressure; the maximum pressure, which may be approximately twice the minimum value, is usually limited by other considerations. The electrode pressure varies with the types of welders used and the materials being welded.

The electrode spacing is another parameter of surface welding, although it is not critical. A good rule of thumb is to select a convenient spacing approximately twice the thickness of the material upon which the electrodes are positioned. At least a two to one range in selected electrode spacing is usually tolerable. However, from an energy variation standpoint it is recommended that the selected spacing be maintained to within −20% when not using dynamically controlled power supplies.

It is thus seen that surface welding depends upon a dissimilar metal plating or coating applied to one or both of the adjoining faces of the two pieces of material being joined. Heat with pressure is applied so that the plated or coated metal diffuses and/or incipiently fuses to create a strong bond. Incipient fusion is herein defined as the state of a material in the region of maximum solidus temperature immediately below the liquidous state. Usually a small amount of the parent ribbon material (member 14 or 14') enters into the bonded region by alloying with the plating or coating material. The mutually diffused material is normally confined to the thin interface layer or bond 22 or 22' whose physical strength exceeds that of the plating or coating and often that of the parent material. A unique characteristic of a surface weld made with certain embodiments of the inventive material is that while the bond is often as strong or stronger than the base metal, the weld may be separated by the proper peel technique without damaging or distorting terminal 12, for example. This permits another ribbon conductor (member 14) to be rewelded many times to a given terminal. In addition, the material immediately under and between electrodes 18 and 20 is usually only sufficiently elevated in temperature so as to approach its melting temperature. Thus, stress at the usual nugget interface is avoided and the original grain structure and material strength properties are not detrimentally disturbed.

Certain metallurgical aspects of a surface weld are helpful in understanding the physical and electrical properties of this type of weld. The nature of current penetration has been shown by microsections of the weld in the region immediately below the inner heel of one of the electrodes at very near maximum permissible weld energy, which heat affected zone indicates the nature of the current pulse wave as it enters the material and generates heat. The high positive resistivity temperature coefficient of nickel, for example, provides this highly desirable property, which causes virtually instantaneous heat availability at the joining interface to elevate the materials to the proper diffusion temperature. This phenomenon does not make the weld dependent upon the relatively sluggish thermal flow that emanates from the top highly heated surface.

When viewing sectional microphotographs of surface welds utilizing a parent or base metal which is plated or coated with the inventive fusible material, the following conditions are noted. Near the heels of the electrodes undisturbed grain structure of the parent material can be seen. In the vicinity of the outermost regions of the jointed interface there are light appearing lines that are the alloy plating or coating material in its substantially original material state. In the center of the interface region is a dark appearing line; this is the mutually diffused region where the surface weld occurs. In between the surface weld and the outer plated regions are feathered transitional zones. These thinned zones not only provide appreciably diffused states with sound metallurgical properties, but a phenomenon known as "thin-film adhesion" is believed to exist, particularly in the outer thin regions and in the immediate nearby vicinity of the original plating. The theory is that two metal surfaces placed in intimate contact, separated by a film sufficiently thin, have the same molecular adhesion as in one discrete piece of metal. Electrons are expected to flow somewhat as readily in these outer regions as in the parent material.

Upon further magnification of the actual surface weld area described directly above, the dark appearing line has an appearance similar to the "bead" obtained in oxyacetylene welding. The bead-like structure is thought to be a highly ordered metallic crystal structure similar to a perfectly grown monolithic dendrite. Diffusion formations may be seen by virtue of the striations on either side of the surface weld "bead." The bead is formed in the interface region at temperatures in the upper vicinity of the diffusion zone and in the lowermost portion of the incipient fusion zone (see FIG. 6). This highly ordered crystal lattice offers an explanation for the very high strength exhibited by the surface weld of the electronic transmission material of this invention. However, sound surface welds may also be formed without developing the bead-like structure. These welds are formed under relatively cool interface temperatures and are perfectly satisfactory. Excellent bonds are developed in the vicinity well below incipient fusion but sufficient molecular mobility does not exist to permit growth of the highly ordered crystalline structure described above.

The severability feature of a properly controlled surface weld is highly desirable for many applications from a servicing viewpoint. The weld may be separated easily in a peeling manner much like a can is opened with a key. The ribbon, for example, is cut near the weld and the small end beyond the weld is pried up slightly. The lifted end is grasped between the tips of an appropriate tool, similar to long nosed pliers, with a firm grip and the tool rolled upon one of its radii in the direction toward the weld. Depending upon the convenience of approach, the tool which incorporates radii on its sides as well as its end may be placed on its side and rolled with a twist of the wrist, or the tool may be placed on its side and rolled over. This technique provides a nearly neutral force axis near the interface if a slight downward pressure is applied during the rolling motion. This virtually eliminates the extracting force that otherwise might be placed upon the terminal.

As pointed out above, many rewelds to a given terminal may be accomplished with no loss in strength with successive welds. Since a slight buildup of the alloy develops after each peel, it is sometimes desirable that the excess material be removed by a few deft strokes of a smoothing file after a number of rewelds have been made on the same terminal.

Since the surface weld strength is not as strong in peel as in shear, the characteristics of the weld strength at various angles of torsion (shear) and peel are illustrated in FIG. 5 for a weld utilizing a specific composition of the fusible material. Note that torsional angular stress is somewhat trigonometric in decreasing strength and that peel strength decreases linearly. This data serves as a guide to the proper application of stress where true shear loading cannot be accommodated. It is noteworthy that large angles of departure from the shear plane are required before a serious loss in strength is realized. Also, note that the peel strength drops to a point and then levels out without further reduction. With the advent of longer pulse welders, the peel strength may be substantially increased over a large angle of pull with the same composition of fusible coated or plated material, thus increasing the applicability of the fusible material and the minimum strength may be increased nearly to that of the parent material, about 80% of the maximum.

Tests have been conducted to determine the proper weld energy range for making welds utilizing certain of the coated or plated base metals and to verify the welding characteristics; namely tack point, shear or pull strength, and peel strength. By establishing data it can be determined which weld energy setting for the specific welding equipment being utilized produces the desired shear strength of the type of material being utilized to produce the repairable weld. Practically every substantially different combination of the components of the fusible material by weight utilized in the coating or plating requires a slightly different weld energy setting and produces different shear and peel characteristics. In addition, different batches of the base metal with the attendant electrical and metallurgical variations will produce slight weld energy differences. Also, it should be noted that energy settings may vary due to the variations in the power supply and the internal and external conditions of the welding equipment. Different types of welders have different internal characteristics and thus produce variations in the weld energy settings.

The following definitions are set forth for a more complete understanding of FIGS. 5 and 6:

(1) Tack point—weld energy at which bonding is about or beginning to occur.

(2) Shear (pull) strength—the number of pounds stress (pull) required to shear or break the material under test.

(3) Peel strength—the number of pounds stress (pull) normal to the surface required to peel the transmission line (member 14), for example, from the element to which it was welded (terminal 12).

(4) No peel point—the minimum energy or related temperature point at which no peel occurs; i.e., which substantially forms a nugget-like structure or totally diffused region as in conventional welding. However, as the pulse length capability of welders is lengthened, it has been found that non-peelable welds can be more readily obtained with certain relatively thick material that would not produce a non-peelable weld at a shorter pulse duration.

As determined by tests, surface welds with good properties may be obtained even though the energy range is varied appreciably. However, there are certain physical restraints that must be observed to assure proper surface weld characteristics. The important physical dimension of the ribbon 14 and the terminal 12 are related to the surface weld temperature zone as illustrated in FIG. 6.

As clearly shown in FIG. 6, there is an upper thickness limit to the ribbon or material 14 for obtaining proper interface temperatures at reasonable pulse durations. With a ribbon of the thickness $d$ the "interface plane" 34 and "tack energy" 36 intercept point is indicated at 38. If the distance of interface plane 34 from the "surface plane" 40 of ribbon 14 is considerably increased to the thickness $d'$, e.g., approximately doubled, a temperature gradient curve through the new tack energy point 42 intersects the surface plane 40 at a temperature very near the melting point of nickel, for example, as indicated at 44. Thus ribbon of thickness $d'$ leaves very little latitude in weld energy as it relates to the permissible surface weld temperature having good bondability.

On the other hand, if the interface distance (ribbon thickness) is decreased to very small values as indicated at $d''$, i.e., less than 5 mils, interface temperatures above (to the right of) the upper diffusion zone boundary line 46 as indicated at 48 represent a significant portion of the weld range occurring in which peel conditions may not exist. Note that the shaded area to the right of point 48 (the questionable peel or no peel area is substantially equal to the shaded area to the left of point 48 thereby limiting the weld energy range. The peel or repairable characteristic of the material of this invention does not occur at fusion interface temperatures and is highly unlikely at incipient fusion interface temperatures.

In the event of "thin" terminal members 12 another restriction is placed on the weld energy, this being the maximum stress temperature 50 for the encapsulant or bonding material of module 6. The dotted line indicated at 52 illustrates the maximum energy temperature gradient curve for proper operation with "thin" terminal surface welding applications. Note that peelability is always assured using appropriate fusible material with a "thin" terminal by virtue of the encapsulant temperature limit as indicated by the intersection of 50 and 52.

The curves of FIG. 6 provide a method or model to establish the parameters for a given application, namely, nickel. In establishing such a model for new applications, the following four boundary conditions should be considered:

(1) Initial diffusion temperature "tack" weld energy, 38.

(2) Upper surface melting temperature weld energy, 44.

(3) Maximum encapsulant or substrate temperature, intersection of 50 and 52.

(4) Peel weld energy limit (if any), 46.

It is thus apparent from FIG. 6 that a weld schedule for a specific welder and a specific ribbon or material thickness can be established for the required temperature along interface plane 34 for initial diffusion temperature (tack point) weld energy and the peel weld energy limit. This is accomplished by the determination of how much heat (weld energy) must be applied on the surface plane 40 to provide the required "tack" and maximum "peel"

temperatures on plane 34 for that specific ribbon thickness.

From the above it is apparent that terminals 12 must be proportioned properly and designed to obtain the desired surface weld conditions. In order to obtain proper heat balance the unit volume of the ribbon or member 14 encompassed immediately under and between the electrodes should be equal to or less than the corresponding region of the terminal. Usually the terminal effective volume (thermal mass) is two to three times the unit volume of the ribbon under the electrodes.

The coating or plating 15 should be sufficiently thick to provide alloy material for the interface bond 22, but should not be so thick as to extrude from the edges of the weld so as to create short circuit hazards. A plating or coating of a thickness of from about 200 to 300 microinches has been found satisfactory.

In Rockwell hardness tests the interface bond 22, utilizing a certain composition of the fusible material, measured on the B scale was 100 while such hardness for the base ribbon material utilized was 80.

As pointed out above, parameters of electrode pressure, electrode spacing, and electrode configuration are important considerations in achieving a good serviceable weld. Although some variation is permissible in the respective parameters, a pressure of 10 pounds per electrode, a spacing of 0.035 inch, and a rectangular configuration of 0.030 inch by 0.60 inch for the electrodes have yielded excellent results when welding a nickel ribbon of 12 mil thickness and 30 mil width with the fusible material of a certain composition coated or plated thereon to the thickness described above.

While the above mentioned copending applications utilized various combinations by weight of indium and gold, and in some instances the inclusion of copper, as the fusible material, it has been discovered that certain other combinations of material by weight can be utilized for various applications and it is these combinations of fusible material to which the present invention is directed and such compositions will be described directly below. While each of the compositions of fusible materials described above have particular utility with nickel as the base metal, other metals, as exemplified above, may be used.

To improve toughness of nickel base surface weld alloys an alloy having the following proportions of materials may be used wherein the percentages are by weight and pertain to the surface weld zone:

Material 1: Nickel (Ni)-gold (Au)-chromium (Cr).
Material 2: Nickel (Ni)-gold (Au)-chromium (Cr)-indium (In).
Material 3: Nickel (Ni)-gold (Au)-chromium (Cr)-copper (Cu).

Percentages by weight:

Ni-Au: 5% to 60% Ni with respect to Au.
Ni-Cr: 35% to 55% Ni with respect to Cr.
In-Au: About 0% to 19% In with respect to Au.
Cu-Au: 5% to 70% Cu with respect to Au.

The use of indium is optional to obtain peel. Long weld pulses are desirable with these materials to fully develop the material combination alloy.

The materials 1–3 may be electroplated to give proper proportions or may be mixed in a suitable binder and applied directly as in the above mentioned application Ser. No. 442,144 and referred to hereinafter as a "dispersion." To minimize the amount of Au, Ni and Cu may be used as "fillers" to provide the minimum amount (approximately ¼ mil for several mil thick material) for good mechanical wetting of the abutting faces. The copper and/or nickel may be borrowed from the parent or base material. The chromium may also be borrowed if available from a properly proportioned Ni-Cr alloy (eutectoid region) of the parent member(s). The Ni-Au-Cr is particularly of interest in high strength structural joining wherein the originally developed grain and "fiber" structure of the material is not substantially disturbed by the joining process. Cu-In is to be avoided due to the very complex constitutional phase relationships and the associated unpredictable mechanical properties.

To provide a surface weld for zirconium and its alloys the following proportions of the shallow eutectoid of Nb-Z is set forth for application by dispersion methods:

Material 4: Niobium (Nb)-zirconium (Zr).

Percentages by weight: Nb-Zr: 5% to about 75% Nb with respect to Zr.

To provide a surface weld for vanadium and its alloys the following proportions of the shallow eutectoid of Nb-V is set forth for application by dispersion or electroplating methods:

Material 5: Niobium (Nb)-vanadium (V).

Percentages by weight: Nb-V: 10% to about 80% Nb with respect to V.

To provide a titanium surface weld alloy(s) by virtue of distinct and mutual eutectoids of Ti-Cu and Ti-Ni, the following proportions are set forth for application by dispersion methods:

Material 6: Titanium (Ti)-copper (Cu).
Material 7: Titanium (Ti)-nickel (Ni).
Material 8: Titanium (Ti)-nickel (Ni)-copper (Cu).

Percentages by weight:

Ti-Cu: about 10% to 38% Cu with respect to Ti.
Ti-Ni: about 7% to 37% Ni with respect to Ti.

To provide a surface weld between nickel and palladium by virtue of the mutual eutectoids of Ni-Pd and Au-Ni the following proportions are set forth for application by dispersion or electroplating methods:

Material 9: Nickel (Ni)-palladium (Pd).
Material 10: Nickel (Ni)-palladium (Pd)-gold (Au).

Percentages by weight:

Ni-Pd: 10% to 85% Ni with respect to Pd.
Ni-Au: 5% to 60% Ni with respect to Au.

Gold substantially improves the bonding action because of its lower eutectic and therefore serves as an eutectoid agent.

To provide an aluminum and/or aluminum alloy surface weld by virtue of the eutectic of Al-Mg the following proportions are set forth for application by the dispersion method:

Material 11: Aluminum (Al)-magnesium (Mg).

Percentages by weight: Al-Mg: about 9% to 37% Mg with respect to Al.

Adequate heat and pressure is applied to fracture the usual aluminum oxide coating. Further, the welding may be performed in an inert atmosphere or vacuum in critical applications.

To provide an alternate high strength surface weld for joining nickel and/or copper parent materials by virtue of mutual eutectoids of Cu-Mn, Cu-P and Mn-Ni the following proportions are set forth for application by dispersion methods:

Material 12: Copper (Cu)-Manganese (Mn).
Material 13: Nickel (Ni)-Manganese (Mn).
Material 14: Copper (Cu)-phosphorus (P)-manganese (Mn), or copper (Cu)-phosphorus (P) and manganese (Mn).

Material 15: Copper (Cu)-manganese (Mn)-nickel (Ni), or manganese (Mn), or manganese (Mn) and copper (Cu), or manganese (Mn) and nickel (Ni).
Material 16: Nickel( Ni)-manganese (Mn)-copper (Cu)-phosphorus (P).

Percentages by weight:

Cu-Mn: 7% to 75% Mn with respect to Cu.
Mn-Ni: 10% to about 80% Mn with respect to Ni.
Cu-P: 2% to 12% P with respect to Cu.
Ni-P: 3% to 14% P with respect to Ni.

Phosphorus serves as an eutectoid catalyst and wetting agent. The percentages by weight pertain to the surface weld zone as in the previously described materials. In addition, gold may appear in small to fairly generous amounts, having been borrowed from a plating, likewise a small trace amount of chromium. Also, nickel-iron alloys with a large amount of nickel, e.g., Kovar and stainless steel, may be joined by these materials 12–16.

To provide a high strength surface weld to copper; or a moderate strength, low cost weld to nickel or Ni-Cu in combination or as an alloy by virtue of mutual eutectoids of Ni-Au, Au-Cu, Cu-P, Ni-Cr, and Ni-P the following proportions by weight are set forth for application generally by dispersion methods:

Material 17: Nickel (Ni)-gold (Au)-copper (Cu)-phosphorus (P).
Material 18: Nickel (Ni)-gold (Au)-chromium (Cr)-copper (Cu)-phosphorus (P).
Material 19: Nickel (Ni)-copper (Cu)-phosphorus (P).
Material 20: Nickel( Ni)-copper (Cu)-chromium (Cr)-phosphorus (P).

Percentages by weight:

Ni-Au: 5% to about 100% Ni with respect to Au.
Ni-Cr: 35% to 55% Ni with respect to Cr.
Cu-P: 2% to 12% P with respect to Cu.
Ni-P: 3% to 14% P with respect to Ni, the P normally being borrowed from the Cu-P.

Therefore, the Cu-P will desirably be heavily doped with phosphorus, ca. 10%. Similarly, the gold may be borrowed from the plating or coating that may be applied to either or both parent members. Likewise, the chromium may be easily borrowed by virtue of the Cr-P eutectic. Also, nickel-iron alloys with a large amount of nickel, e.g., Kovar and stainless steel, may be joined by these materials. While the materials 17–20 are primarily applied by a dispersion method, under certain conditions where phosphorus is co-deposited with nickel as nickel phosphide, the materials can be applied by electroplating.

As the electroplating art progresses, more of the fusible materials set forth above may be applied by this process. Also, while the above referenced electroplating process has been described as utilizing a separate plating tank for each of the components of the material such that they are plated in layers or laminations, the advancing state of the art is such that certain of these components may be mixed as a solution for electroplating applications. Also, it is within the scope of the invention to utilize other binding agents for the powdered material components than those set forth above in applying these materials by a "dispersion" application. In addition, as the electroplating art progresses, it is feasible to plate the materials in the form of a ribbon or the like and merely secure the desired amount of this ribbon to the base metal to be welded until it is fused and diffused with the parent metal by the surface welding technique described above. Also, the inventive material may be produced by a well known cladding technique.

It has thus been shown that this invention advances the state of the art by providing various combinations of fusible material which are readily applicable to the surface welding technique for interconnecting metallic members.

Although particular embodiments of the invention have been illustrated and described, modifications will become apparent to those skilled in the art, and it is intended to cover all such modifications as come within the true spirit and scope of the invention.

What we claim is:

1. A process for interconnecting metallic terminal members comprised of material having atomic radii compatible with welding techniques through the medium of a peelable surface weld comprising the steps of: positioning a laminate strip member in abutting relationship with respect to said metallic terminal members; said strip member including a first layer of material containing components which fuse, diffuse and coact with the parent metal of said metallic terminal members under the application of welding energy and a second layer of material; said first layer being positioned adjacent to said metallic terminal members; applying welding energy by means of electrodes to said second layer; said electrodes being spaced a distance on the order of twice the thickness of said strip member and being applied thereto with a pressure on the order of 10 pounds per electrode; and the thermal mass of said metallic terminal members being on the order of 2–3 times the unit volume of said strip member under said electrodes; whereby an interface bond is formed between said metallic terminal members and the adjacent abutting portions of said strip member.

2. The fusible material defined in claim 1, wherein said plurailty of components are in a powdered form and mixed in a suitable binder.

3. The process defined in claim 1, wherein said plurality of components consists essentially of at least certain of the elements from the group consisting of nickel, gold, chromium, copper, and indium, wherein the nickel is in the range between about 5% to about 60% with respect to the gold and about 35% to about 55% with respect to the chromium, wherein the indium is in the range between about 0% to about 19% with respect to the gold, and wherein the copper is in the range between about 5% to about 70% with respect to the gold.

4. The process defined in claim 1, wherein said plurality of components consists essentially of at least certain of the elements from the group consisting of nickel, titanium, and copper, wherein the nickel is in the range between about 7% to about 37% with respect to the titanium, and wherein the copper is in the range between about 10% to about 38% with respect to the titanium.

5. The process defined in claim 1, wherein said plurality of components consists essentially of aluminum and magnesium, and wherein the magnesium is in the range between about 9% and about 37% with respect to the aluminum.

6. The process defined in claim 1, wherein said plurality of components consists essentially of at least certain of the elements from the group consisting of nickel, manganese, copper, and phosphorus, wherein the manganese is in the range between about 7% to about 75% with respect to the copper and about 10% to about 80% with respect to the nickel, and wherein the phosphorus is in the range between about 2% to about 12% with respect to the copper and about 3% to about 14% with respect to the nickel.

7. The process defined in claim 1, wherein said plurality of components consists essentially of at least certain of the elements from the group consisting of nickel, gold, copper, phosphorus and chromium, wherein the nickel is in the range between about 5% to about 100% with respect to the gold, and about 35% to about 55% with respect to the copper, and wherein the phosphorus is in the range between about 2% to about 12% with respect to the copper and about 3% to about 14% with respect to the nickel.

8. The process defined in claim 1, wherein said plurality of components are combined by a cladding technique.

References Cited

UNITED STATES PATENTS

| | | | |
|---|---|---|---|
| 2,664,844 | 1/1954 | Siegrist. | |
| 2,688,574 | 9/1954 | Reed | 29—199 X |
| 2,691,816 | 10/1954 | Siegel | 29—199 X |
| 3,065,539 | 11/1962 | Hannegan | 29—199 X |
| 3,092,899 | 6/1963 | Dega | 29—199 X |
| 3,245,764 | 4/1966 | La Plante | 29—199 X |
| 3,345,145 | 10/1967 | Pijls | 29—199 X |
| 3,382,054 | 5/1968 | Coad | 29—199 X |

HYLAND BIZOT, Primary Examiner

U.S. Cl. X.R.

29—194, 198